Figure 1:
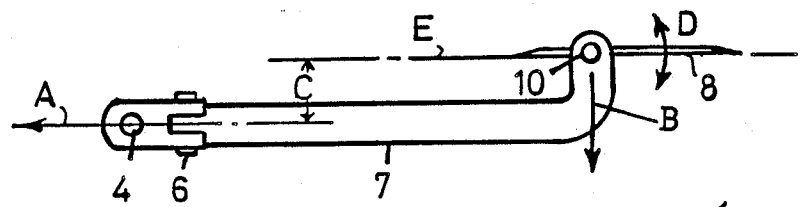

United States Patent [19]

Fuss et al.

[11] Patent Number: 4,930,580
[45] Date of Patent: Jun. 5, 1990

[54] VEHICLE MOUNTED LAWN EDGER

[76] Inventors: Jarvis R. Fuss, 143 Tourist Road; Eric W. Fuss, 3 Heller Street; Roy M. Fuss, 21 Leslie Street; Roger D. Fuss, Mail Service 1497, Anzac Avenue, all of Toowoomba, 4350 Queensland, Australia

[21] Appl. No.: 224,463

[22] Filed: Jul. 26, 1988

[30] Foreign Application Priority Data

Jul. 31, 1987 [AU] Australia .............................. PI3449

[51] Int. Cl.⁵ ............................................ A01D 34/84
[52] U.S. Cl. ...................... 172/15; 172/572; 172/464
[58] Field of Search ............... 172/572, 573, 413, 501, 172/500, 482, 464, 491, 14, 15

[56] References Cited

U.S. PATENT DOCUMENTS

| | | | |
|---|---|---|---|
| 2,358,298 | 9/1944 | Benjamin | 172/464 X |
| 2,906,080 | 9/1959 | Light | 172/14 |
| 4,046,200 | 9/1977 | Mullet | 172/14 |
| 4,049,059 | 9/1977 | Weibling | 172/15 |
| 4,200,155 | 4/1980 | Mullet | 172/14 |
| 4,453,372 | 6/1984 | Remer | 562/13.7 |
| 4,532,998 | 8/1985 | Feikema | 172/15 |
| 4,691,784 | 9/1987 | Mullet | 172/15 |
| 4,724,910 | 2/1988 | Wheeler | 172/572 |

Primary Examiner—Richard J. Johnson
Attorney, Agent, or Firm—James C. Fails; Arthur F. Zobal; Geoffrey A. Mantooth

[57] ABSTRACT

An edge cutter comprising a cutter member and support means therefore adapted to be moved to cut along a guide such as the edge of a path, comprising:

means to support the cutter member on transport means, means to allow the cutter member to move laterally with respect to the direction of movement of the transport means, means to urge the cutter member to move toward the guide, and, means to allow the cutter member to caster to align with the guide.

7 Claims, 2 Drawing Sheets

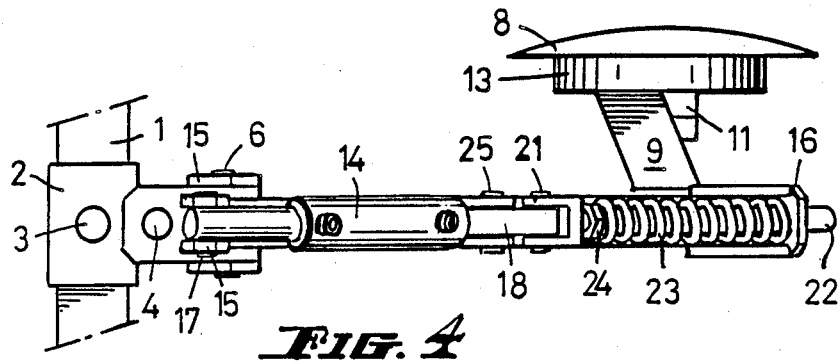
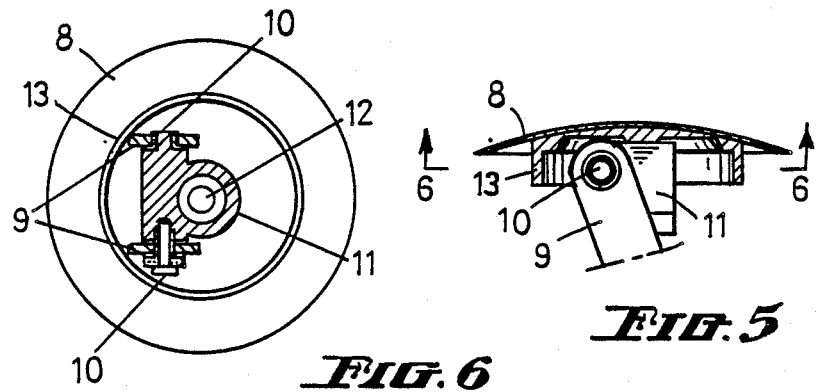

VEHICLE MOUNTED LAWN EDGER

This invention relates to a grass edger and in particular it relates to an edger of the type in which a cutting member is adapter to be moved against the edge of a path or the like and is controlled in its position by a depth-control flange projecting from one side of the cutting member.

Apparatus of this type has in the past usually consisted of a flanged cutting disc mounted on an arm pivotally connected to support means such as a tractor and provided with pressure means to maintain the free end of the arm which carries the cutting member at the correct operating depth, the depth being limited by the depth-control flange.

It was necessary with the known devices for the operator to drive the tractor or other towing means along the path at a regulated position to maintain the cutting member at all times in the correct position in contact with the edge of the path, thus necessitating careful driving to maintain correct operation. In some known devices the operator has to adjust the position of the cutting member.

It is an object of the present invention to provide an improved form of grass edger in which the cutting member will accurately follow the edge of the path without the tractor or other towing device having to be maintained at a selected distance from the edge of the path.

It is a further object to provide an arrangement which will position the cutting member at the correct angle.

It is a still further object to so construct the device that a pair of such devices can be operated on both edges of the path at the same time where this is required.

The edger according to this invention comprises means connecting it to the tractor or other towing device and carrying the cutting member in a manner such that the cutting member can move both vertically and horizontally in relation to support means and the cutting member can compensate in angle to maintain its correct cutting position irrespective of the lateral position of the cutting member in relation to the support means, means being included to urge the cutting member against the edge of the path or other guide where the cut is to be effected.

The invention thus comprises an edge cutter which is characterized by means to support the cutting member on transport means, means to allow the cutting member to move laterally with respect to the direction of movement of the transport means, means to move the cutting member toward a guide, and means to allow the cutting member to caster to align with the guide.

In order however that the nature of the invention can be more fully understood an embodiment will be described with reference to the accompanying drawings which are by way of explanation only and are not to be taken as limiting the invention to the specific form shown.

Figure 2:
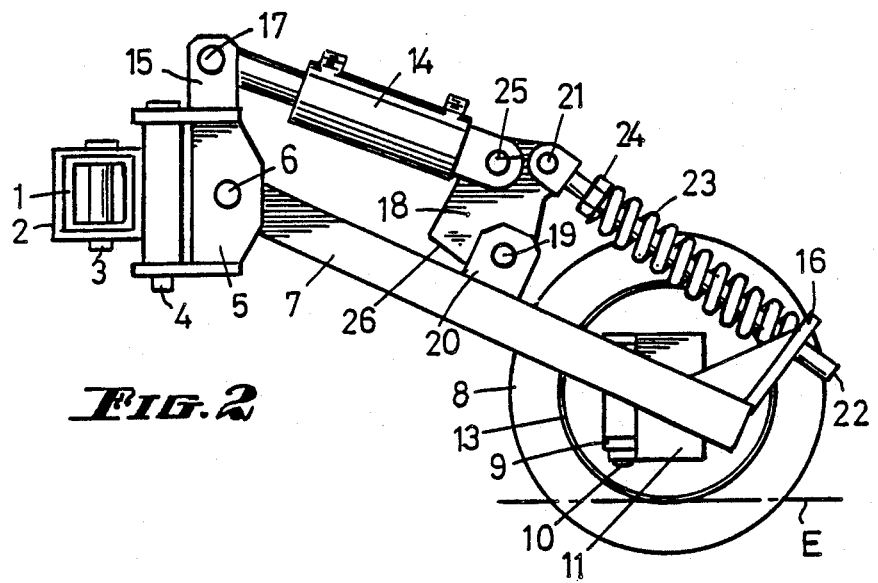
Figure 3:
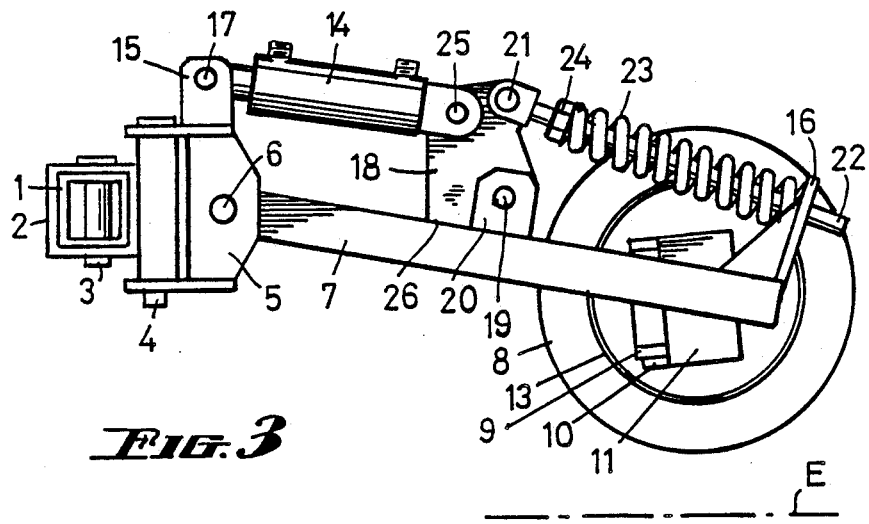

In the drawings,

FIG. 1 is a schematic plan showing the preferred operating form of the improved grass edger, the arrow A showing the direction of movement, the arrow B indicating the inward urging of the cutting member due to the offset C, the arrow D indicating the caster action of the cutting member, E indicating the edge of the path or a guide, FIG. 2 is side elevation of a particular form of the invention depicting the cutting member as a disc rotationally carried on an axle pivoted support arm, showing the cutting member offset from the line of travel of the means which support the pivoted arm so as to urge the cutting member against the guide formed for instance by the edge of a path, and showing the cutting member mounted to caster to align with the guide, the cutting member and arm being shown in cutting position, FIG. 3 is a view similar to FIG. 2 but showing the support arm positioned to raise the cutting member from its cutting position, FIG. 4 is a plan of FIG. 2, FIG. 5 is a sectional plan showing the mounting of the cutting member, showing how the cutting member is mounted to caster, and FIG. 6 is a section side elevation taken as on line 6—6 of FIG. 5.

In the drawings an implement frame bar, which forms what we term the transport means 1, is shown having fitted to it a slideable bracket 2, which can be positioned along the implement frame bar and held by a lock pin 3 to hold it in a selected position, the slideable support bracket 2 carrying a vertical pivot pin 4 which engages a pivoting bracket 5 which in turn has attached to it by a horizontal pivot pin 6, the support arm 7 which extends from the horizontal pivot pin 6 and at the other end carries mounting means for the cutting disc which forms the cutting member 8 of this form of the invention.

The cutting member 8 is mounted towards one side of the support arm 7 by means of a bracket 9 on the support arm 7 which has at its ends a vertical orientation pin 10 connecting a bearing housing 11 to the bracket 9 on the support arm 7, this bearing housing 11 supporting an axle 12 on which is mounted the cutting member 8. The cutting member 8 has extending from it a depth-control rim 13. The axle 12 of the cutting member 8 is disposed rearwardly of the vertical orientation pin 10 which connects the bracket 9 on the support arm 7 to the bearing housing 11.

In this way the cutting member 8 casters in relation to the bracket 9 on the support arm 7 and can take up an alignment with the edge of the path or other guide along which the cut is being made so that it is in fact guided by the edge of the path or other guide in its correct cutting angle and location.

Because the forward end of the support arm 7 is pivoted to the pivoting bracket 5 by the horizontal pivot pin 4, the rear of the support arm 7 can move vertical, that is transverse to the direction of travel, but because the cutting member 8 is offset outwardly from the support arm 7 it, tends to swing inward toward the tractor or other support vehicle and thus is urged against the edge of the path along which it is guided.

The cutting member 8 is downwardly loaded by extension of a hydraulic ram 14 interposed between an extension 15 on the pivoting bracket 5 at the forward end of the arm support 7 and a rear bracket 16 at the free end of the support arm 7, the hydraulic ram 14 being attached at its one end by means of a pivot pin 17 to the extension 15 and at its other end to a pivot plate 18 carried from the support arm 7 on a pivot pin 19 which supports the pivot plate 18 between a pair of side plates 20 secured to the support arm 7 but allows it to move under influence of the hydraulic ram 14, this pivot plate 18 having attached to it by means of a pin 21 a spring assembly comprising a rod 22 which moves through an aperture in the bracket 16 at the rear end of the support arm 7 but is encircled by a spring 23 and has stop means 24 to cause the spring 23 to urge the free end of the support arm 7, and thus the cutting member 8, downwardly to in turn cause the depth-control rim 13 to be held in contact with the surface of the path at the edge where the cutting member 8 operates. The rear end of the hydraulic ram 14 is connected to the pivot plate 18 by a pin 25.

In this way the assembly can be pivotally supported from a tractor or other towing support, but the end of the support arm 7 carrying the cutting member 8 can move in and out to accommodate itself to changes in the position of the traction in relation to the edge of the path, or guide, and also by using left and right units of this type attached one on each side of the tractor or the towing support it is possible to cause the grass edger to operate simultaneously on two sides of the path which is being traversed by the tractor or other towing support.

The cutting member 8 can be raised from its spring held working position by the hydraulic ram 14 because the pivot plate 18 has on it a flat 26 which contacts the support arm 7 when the hydraulic ram 14 is sufficiently retracted and then locks the pivot plate 18 against further movement relative to the support arm 7, further retraction of the hydraulic ram 14 then tilting the support arm 7 to move its rear end upward and carry the cutting member 8 out of working position as shown in FIG. 3.

In the working position shown in FIG. 2, tilting of the pivot plate 18, by operation of the hydraulic ram 14, varies the pressure exerted by the spring 23 on the rear of the support arm 7 and thus allows the loading on the cutting member 8 and depth-control rim 13 to be varied.

The cutting member 8 could be an inclined slicing blade instead of the disc shown, or the support arm 7 could be replaced by other means to allow lateral movement of the cutter member 8 on the transport frame, or the offset construction could be replaced by a spring or other means to laterally urge the cutter member toward the guide.

From the foregoing it will be realized that a highly effective grass edger is provided which automatically adjusts to the correct position irrespective of reasonable deviation in the movement of the tractor or other towing support.

We claim:

1. An edge cutter adapted to be supported on transport means and to cut along a guide on the surface on which the transport means moves, said edge cutter comprising: a support bracket adapted to be mounted on the transport means; a pivoting bracket carried by a vertical pivot pin on said support bracket; a support arm engaged at a first end on a horizontal pivot pin on said pivoting bracket whereby a second end of the support arm can move laterally and rise and fall; a bearing housing carried on the second end of the support arm by a vertical orientation pin on the support arm, a disc-shaped cutter member supported on a horizontal axle remote from the axis of the vertical orientation pin whereby the cutter arm trails the orientation pin to allow such cutter member to caster to a line with said guide when in contact with said guide; means on a support arm to urge the cutter member toward said guide; and means to limit the operating depth of the cutter member.

2. An edge cutter according to claim 1 wherein said means to move said cutter member laterally comprise means to offset said cutter member from the line of travel of said vertical pivot pin of the bracket whereby to urge said cutter member toward the line of travel of said vertical pivot pin.

3. An edge cutter according to claim 1 characterized by means to load said cutter member downward into cutting position.

4. An edge cutter according to claim 1 wherein the means to urge the said cutter member downward to cutting position comprises a spring disposed between said pivoting bracket and said support arm.

5. An edge cutter according to claim 1 wherein a hydraulic ram is disposed between said pivoting bracket and said spring to adjust the spring pressure urging said cutter member downward into its cutting position.

6. An edge cutter according to claim 1 characterized by a pivot plate connected to said support arm by a pivot pin and interposed between said hydraulic ram and said spring, and by a flat on said pivot plate positioned to contact said support arm when said hydraulic ram is retracted whereby to lift said cutter member from working position by operation of said hydraulic ram when said flat is in engagement with said support arm.

7. An edge cutter according to claim 1 wherein said cutter member is a disc mounted to rotate, and means to limit the operating depth of cut of said cutter member comprises a depth-control rim projecting from the side of said disc to engage said guide.

* * * * *